United States Patent [19]

Angner et al.

[11] 4,056,695
[45] Nov. 1, 1977

[54] KEY TELEPHONE LINE CIRCUIT TONE-ON-HOLD ARRANGEMENT

[75] Inventors: Ronald Joseph Angner, Freehold; James Volney Lacy, Red Bank, both of N.J.

[73] Assignee: Bell Telephone Laboratories, Incorporated, Murray Hill, N.J.

[21] Appl. No.: 708,858

[22] Filed: July 28, 1976

[51] Int. Cl.² .............................................. H04M 1/72
[52] U.S. Cl. ........................................................ 179/99
[58] Field of Search .............................. 179/99, 18 AD

[56] References Cited

U.S. PATENT DOCUMENTS

| | | |
|---|---|---|
| 3,865,995 | 2/1975 | Kerman et al. ........................ 179/99 |
| 3,895,192 | 7/1975 | Angner et al. ........................ 179/99 |
| 3,925,625 | 12/1975 | Angner et al. ........................ 179/99 |
| 3,965,308 | 6/1976 | Jones et al. ........................... 179/99 |

Primary Examiner—Kathleen H. Claffy
Assistant Examiner—Randall P. Myers
Attorney, Agent, or Firm—David H. Tannenbaum

[57] ABSTRACT

There is disclosed a circuit for generating tone signals from clocking signals present on each key telephone line circuit. The tone signals are transformer coupled onto the communication leads by an optional plug-in-board arrangement. In present installations music-on-hold is provided by connecting an external music source to each line card. There is also disclosed an arrangement for utilizing the optional plug-in-board to provide either tone-on-hold or music-on-hold by simply reversing a plug-in connector.

11 Claims, 10 Drawing Figures

KEY TELEPHONE LINE CIRCUIT TONE-ON-HOLD ARRANGEMENT

FIELD OF THE INVENTION

This invention relates to a circuit for optionally providing tone or music-on-hold signals to a key telephone line circuit.

BACKGROUND OF THE INVENTION

When a communication path is established between a calling and called party, if one of the parties to the call is associated with a key telephone system, it is possible for the key telephone party to place the call in the active but noncommunicating (hold) mode. In this mode the communication path between parties is maintained active but communications cannot take place. The key telephone party can, by operation of the line key, return the call to the bidirectional communication state.

In some situations it is now possible to provide some form of entertainment, usually music, to the party who has been placed on hold. Several problems exist with present music-on-hold circuit arrangements. These problems have to do primarily with the fact that, for economical reasons, the same line circuit must be used to serve all stations whether or not the music-on-hold feature is provided. Another problem arises in that an external source of entertainment signals must be provided and coupled to the line in a manner which allows the switching network to be protected in the event of trouble conditions with the signal source and in a manner which does not cause a longitudinal imbalance in the signal transmission path.

Thus, a need exists in the art for a line circuit arranged for easy adaptation to the provision of entertainment signals over an active noncommunicating telephone line. A further need exists in the art for such a line circuit which is capable of providing externally generated signals, such as music, and for also providing internally generated signals, such as tone-on-hold, while at the same time being arrangeable to provide neither of these signals.

SUMMARY OF THE INVENTION

A key telephone system line circuit is arranged to generate, from internal clocking signals, a distinctive tone which can be optionally provided over the communication path to a party when the call is placed on hold. The line circuit is also arranged so that externally provided signals, such as music signals, can be substituted for the tone signals by simply reversing a single connector on the line printed wiring board.

The communication lead interface of the line circuit is designed in a manner which allows for the removal of the transformer coupling device when not required and the substitution therefor of the option connector.

The tone signal is generated by a clock circuit and has a 4 sec period. A 1,000 Hz tone is applied for 0.5 sec, removed for 0.125 sec, reapplied for 0.125 sec and then removed for the final 3.25 seconds of the period. The tone is transformer coupled to the line on an optional basis and the same transformer is used to couple music to the line by simply changing the option plug.

Accordingly, it is a feature of our invention to provide a single line circuit capable of easily being convertible to either music-on-hold or tone-on-hold operation, while also being easily used for standard operation, all by the mere reversing or substitution of a single connector.

It is another feature of our invention to provide a key telephone line circuit capable of generating a distinctive tone signal from internal clocking signals and for optionally providing the tone signal to the communication leads of active noncommunicating telephone connections.

BRIEF DESCRIPTION OF THE DRAWING

The purpose of our invention, as well as additional objectives, advantages and features thereof, will be more fully appreciated from the illustrative embodiment shown in the drawing in which.

DETAILED DESCRIPTION

Figure 1:
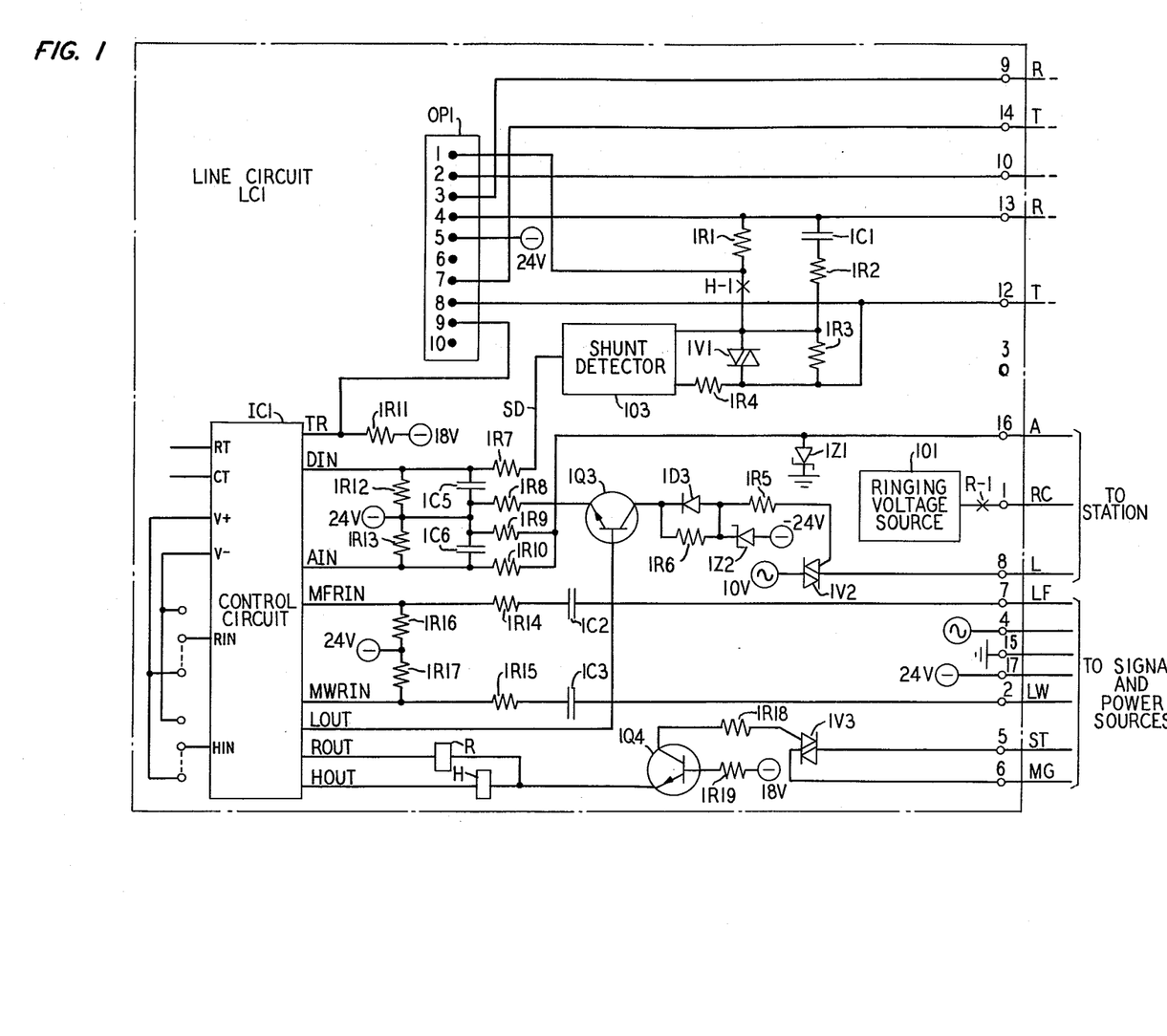
FIG. 1 shows a schematic diagram of the line circuit without the option connector.

As shown in FIG. 1, a typical application for the tone-on-hold and music-on-hold circuit would be in a key telephone system line circuit such as line circuit LC1. The line circuit is plug-in connectable, via terminals 1-17, to the key telephone network. Depending upon the interconnection of pins 1 through 10 of option plug OP1, tone or music signals may be extended over the communication lead pair back via the central office or PBX switching machine to the subscriber connected to line circuit LC1.

By changing the interconnection of pins 1 through 10 of option plug OP1 by using option socket OS1, it is possible to substitute externally provided music signals for the internally generated tone signals. For certain arrangements it is necessary to provide a transformer coupling between the tone or music source and the communication leads. In order to reduce the cost of the basic line circuit such a transformer is not provided on all boards. However, as will be more fully detailed herein, when such a transformer coupling is required a special "daughter" board containing the necessary coupling circuitry is connected to option plug OP1 in the place of option socket OS1. The daughter board is arranged with a second option plug, OP2, the pins of which can be optionally cross-connected by means of option socket OS1 (FIG. 5) to provide either internally generated tone signals or externally provided music signals. In situations where neither tone nor music is desired the daughter board is removed and the pins of option plug OP1 are cross-connected by option socket OS1 in a manner which allows operation of the hold feature without providing the entertainment signals to the party being held. As discussed and as will be more fully detailed, all of the cross-connections of both option plug OP1 and option plug OP2 are accomplished by a single connector, option socket OS1, positioned with respect to each option plug in a particular manner depending upon the desired circuit operation.

Internal Generation of Tone Signals

Figure 6:
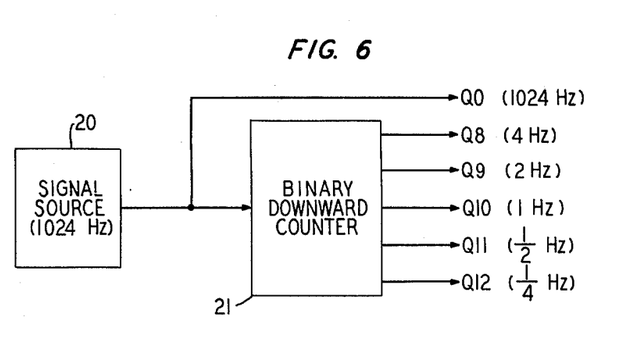
FIGS. 6 and 7 show a schematic diagram of circuitry for generating the tone signals.
Figure 7:
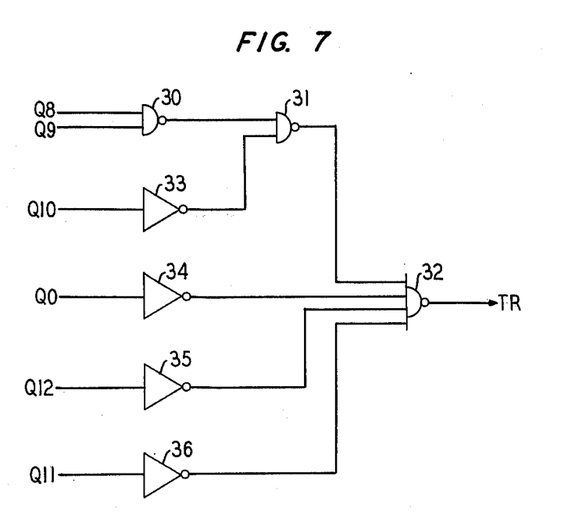
Figure 8:
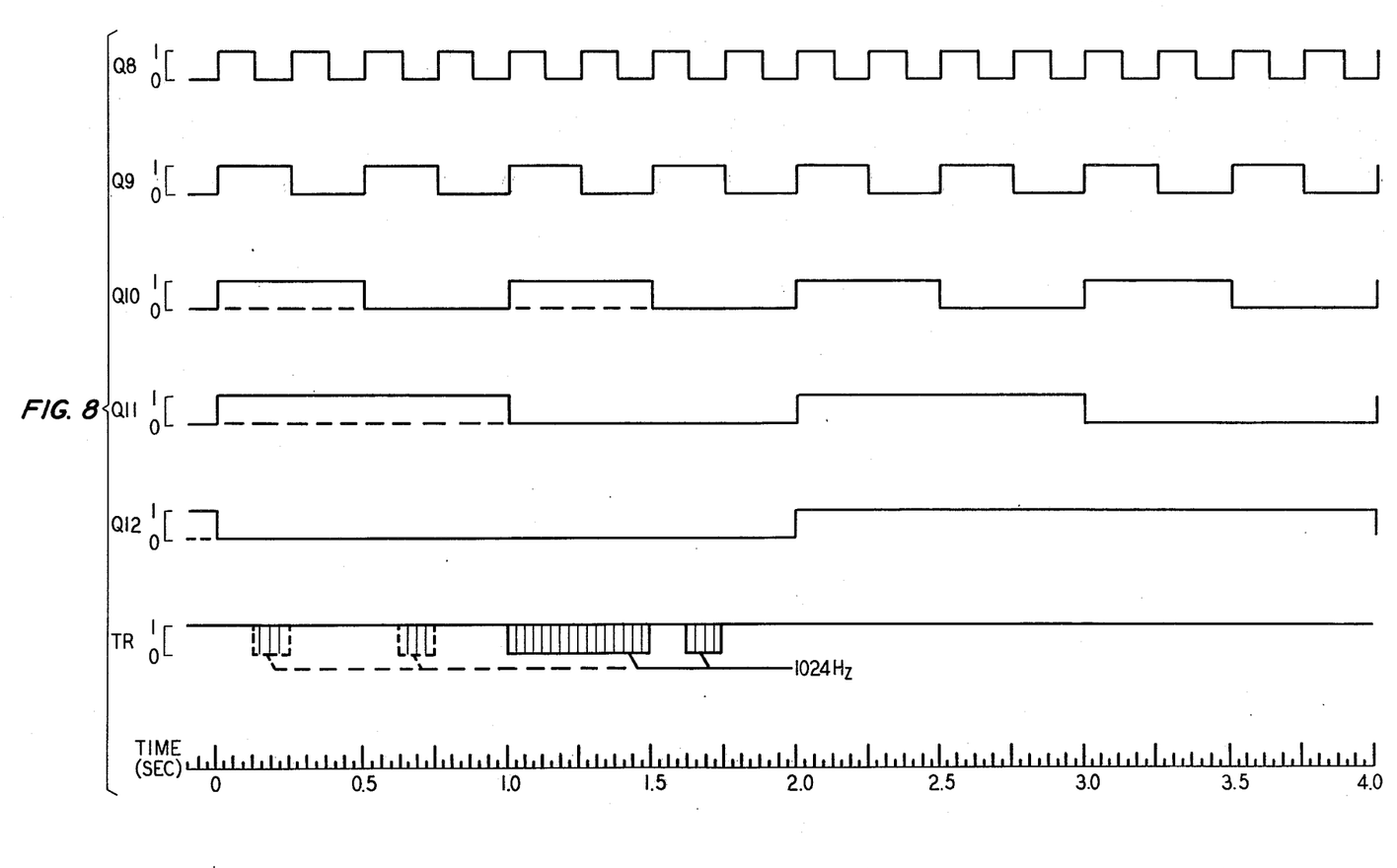
FIG. 8 shows the timing relationship between the various signals.

Turning now in FIG. 6, signal source 20 is arranged in any one of the well-known circuit configurations to provide a 1024 Hz signal. The 1024 Hz signal is provided to binary downward counter 21 constructed in a well-known manner such that the signal oututs Q8, Q9, Q10, Q11 and Q12 have the frequencies shown in FIG. 8. These frequencies are combined in a manner such as shown in FIG. 7 to provide a signal frequency on lead TR having the frequency and duty cycle shown in FIG. 8, such that the signal on lead TR is on for 0.5 sec, off for 0.125 sec, on for 0.125 sec, off for 3.25 sec and repeats in the same manner. This tone signal is provided over lead TR, FIG. 1, to pin 9 of option plug OP1. The tone signal is generated within control circuit IC1, which control circuit also controls the hold, busy and idle states of the line circuit as well as providing clock pulses. The operation of control circuit IC1 is fully described in copending application Ser. No. 708,857. Another line circuit arrangement is shown in U.S. Pat. No. 3,925,625.

Physical Layout of Option Board and Plugs

Figure 9:
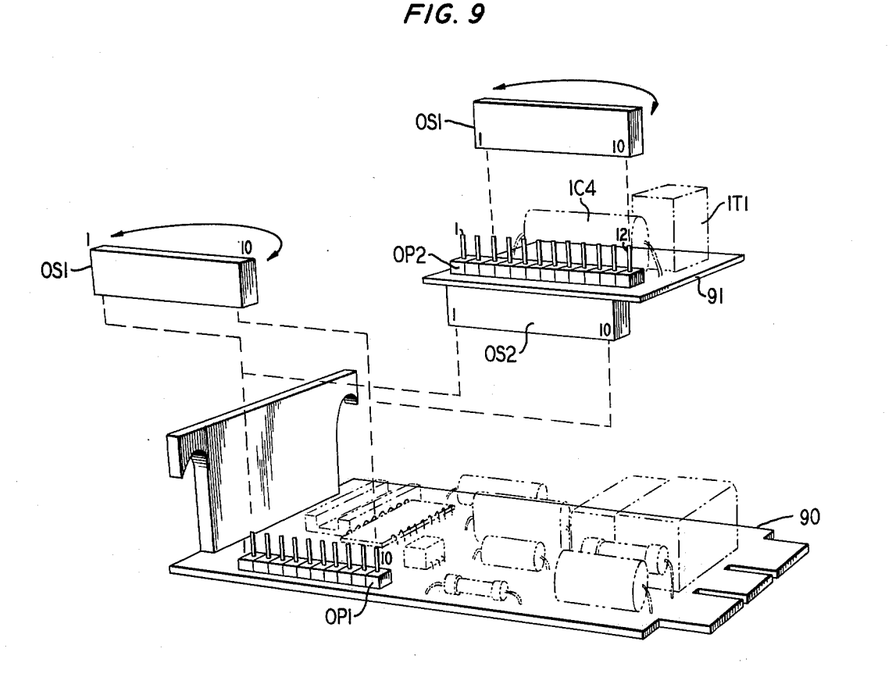
FIGS. 9 and 10 show perspective views of the line circuit, option connector and option coupler board.

Turning to FIG. 9, there is shown line card 90 having mounted permanently thereon option plug OP1 having 10 terminals numbered 1–10. Daughter board 91 is shown having mounted thereon a transformer, two resistors, a capacitor and a varistor. For clarity, some of these elements have not been shown. Also mounted on board 91 is socket OS2 adapted for mating with option plug OP1 when it is desired to include the circuitry of daughter board 91 into the circuitry of line card 90.

A second option plug OP2 is also mounted on daughter board 91 in a manner which allows option socket OS1 to become connected thereto either with the respective terminal 1's in contact or in the reversed position as will be discussed more fully hereinafter. Also, it should be noted, that the same option socket OS1 can be connected directly to option plug OP1 when the daughter board is not needed. In such an arrangement option socket OS1 again can be connected so that the respective terminal 1's are mated or the option connector can be used in the reversed direction to provide a different set of operational characteristics.

Figure 10:
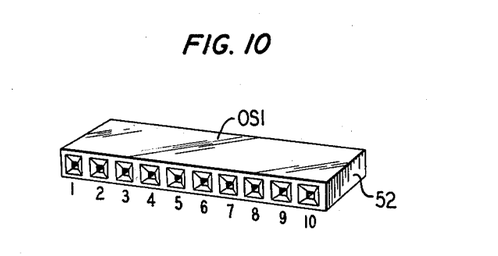

FIG. 10 is a more detailed view of the option socket OS1, the terminals of which are constructed such that terminal pairs 1 and 2; 3 and 4; and 7 and 8 are connected together permanently.

Use of the Line Circuit Without Audio Hold Signals

Figure 2:
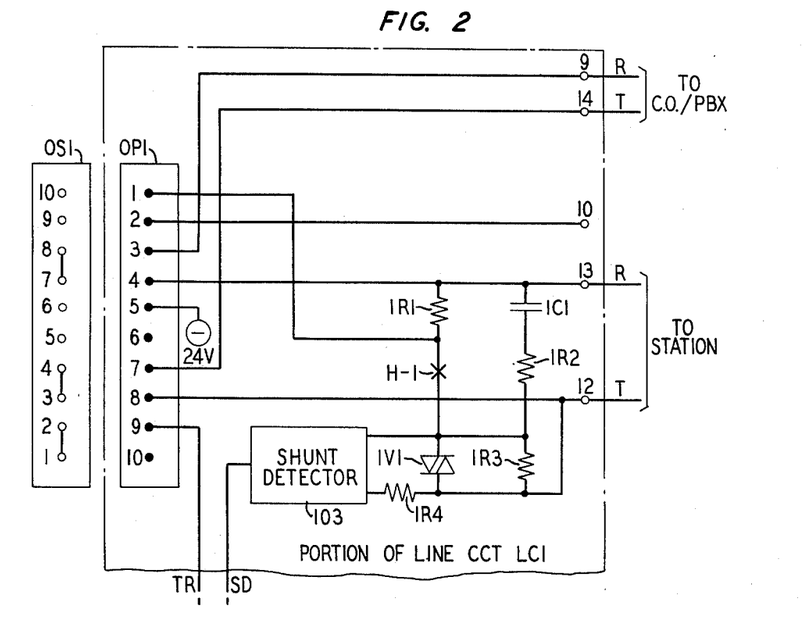
FIGS. 2-5 show portions of the line circuit having the option connector and option coupler board connected in various configurations.

FIG. 2 illustrates the situation where audio signals are not to be supplied to a telephone station which is placed in the hold mode. The hold mode is defined as the condition of the line circuit when the H relay is operated. It should be noted that FIG. 2 is a portion of line circuit LC1 shown fully in FIG. 1. Option plug OP1 is permanently connected into line circuit LC1 as shown and for the situation where audio signals are not to be returned to the station being held option socket OS1 is connected to option plug OP1 in the manner shown where contact 10 of the socket is in mating relationship with pin 1 of the plug and where contact 1 of the socket is in mating relationship with pin 10 of the plug.

As discussed, contacts 1 and 2; 3 and 4; and 7 and 8 of socket OS1 are permanently cross-connected so that when the socket is mated with plug OP1 pins 3 and 4; 7 and 8; and 9 and 10 of plug OP1 become cross-connected. In this configuration, the Central Office (CO) or PBX line from the central switching machine is connected to the line circuit via terminals 9 and 14, and then becomes connected through option plug OP1, to terminals 13 and 12, respectively, of the line card which terminals are also connected to the key telephone station. Since the line circuit shown functions in a shunt manner, the PBX or Central Office line could have been connected directly to terminals 12 and 13 thereby eliminating the need for option socket OS1. Thus, as shown, the line circuit and option plug and socket can be used for either conventional connection of the CO/PBX line to terminals 14 and 9 or for shunt connection of the line to terminals 12 and 13.

Use of the Line Circuit Where Audio Signals are Desired

Figure 3:
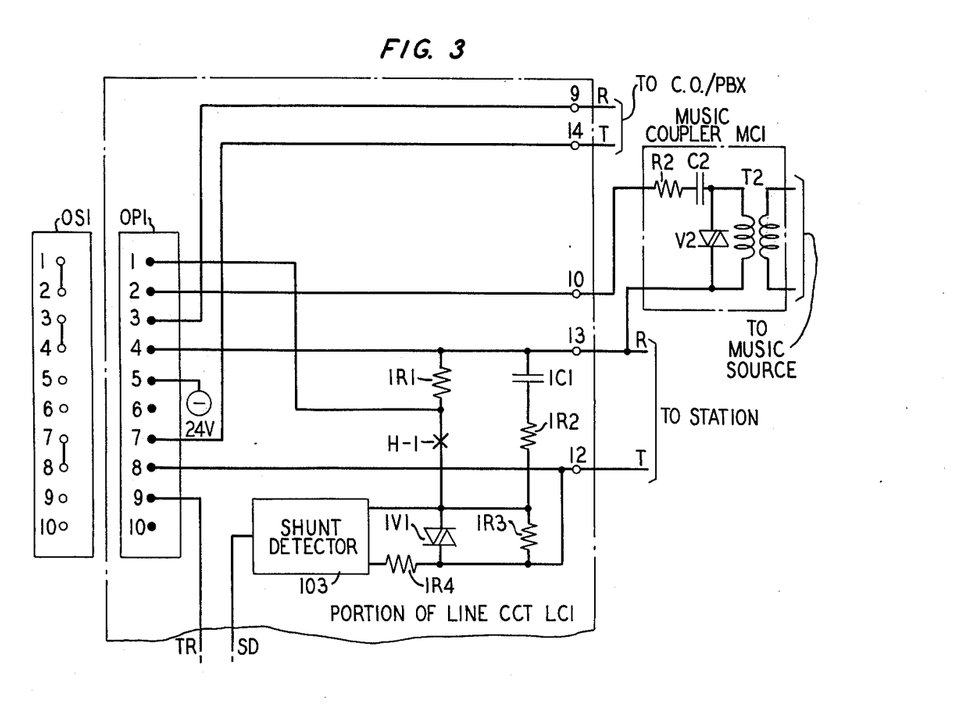

FIG. 3 illustrates the use of the option plug and socket in situations where it is desired to provide externally generated signals, such as music, via an external signal coupler, such as music coupler MC1. In this situation the music signals are connected from music coupler MC1 to the line circuit via terminals 10 and 13 and the CO/PBX line is connected to the line circuit via terminals 14 and 9. Option socket OS1 is mated with option plug OP1 in the reverse direction from that shown in FIG. 2 such that the respective terminals 1 are mated and the respective terminals 10 are mated. Accordingly, option plug OP1 pins 1 and 2; 3 and 4; and 7 and 8 are cross-connected. Thus, the CO/PBX line from terminals 14 and 9 are connected through option plug OP1 to line card terminals 12 and 13, respectively. Music signals, which come onto line circuit LC1 via terminal 10, are extended through option plug OP1, pins 2 and 1 to one side of resistor 1R1, the other side of resistor 1R1 being connected to terminal 13 of the line circuit. The music signals now appear across resistor 1R1, which because of contact H1, are isolated from lead T and therefore no signal voltage is developed across the T and R leads. When relay H operates, in response to a hold signal from the key telephone station, the music signals are extended via enabled make contact H-1 and varistor 1V1 to pin 8 of option plug OP1 and via the cross-connection effected by option socket OS1 to pin 7 and terminal 14 to the T lead of the communication pair back to the CO/PBX. This signal is balanced by the music signal input on terminal 13 which signal is extended through option plug OP1 pins 4 and 3 to terminal 9 and communication lead R. The audio music signals are then communicated to the station connected to line circuit LC1 over the CO/PBX communication leads at all times when line circuit LC1 is placed in the hold mode.

Without changing the wiring of either the line circuit or the cross-connections of the key telephone system it is possible to inhibit the provision of the music-on-hold signals simply by reversing option socket OS1 so that contact 1 mates with pin 10 of option plug OP1. In this configuration, normal communications continue between the key telephone station and the CO/PBX line but the music signals are not extended over the CO/PBX line since pins 2 and 1 of option plug OP1 would not then be cross-connected.

Internally Provided Audio Signals

Figure 4:
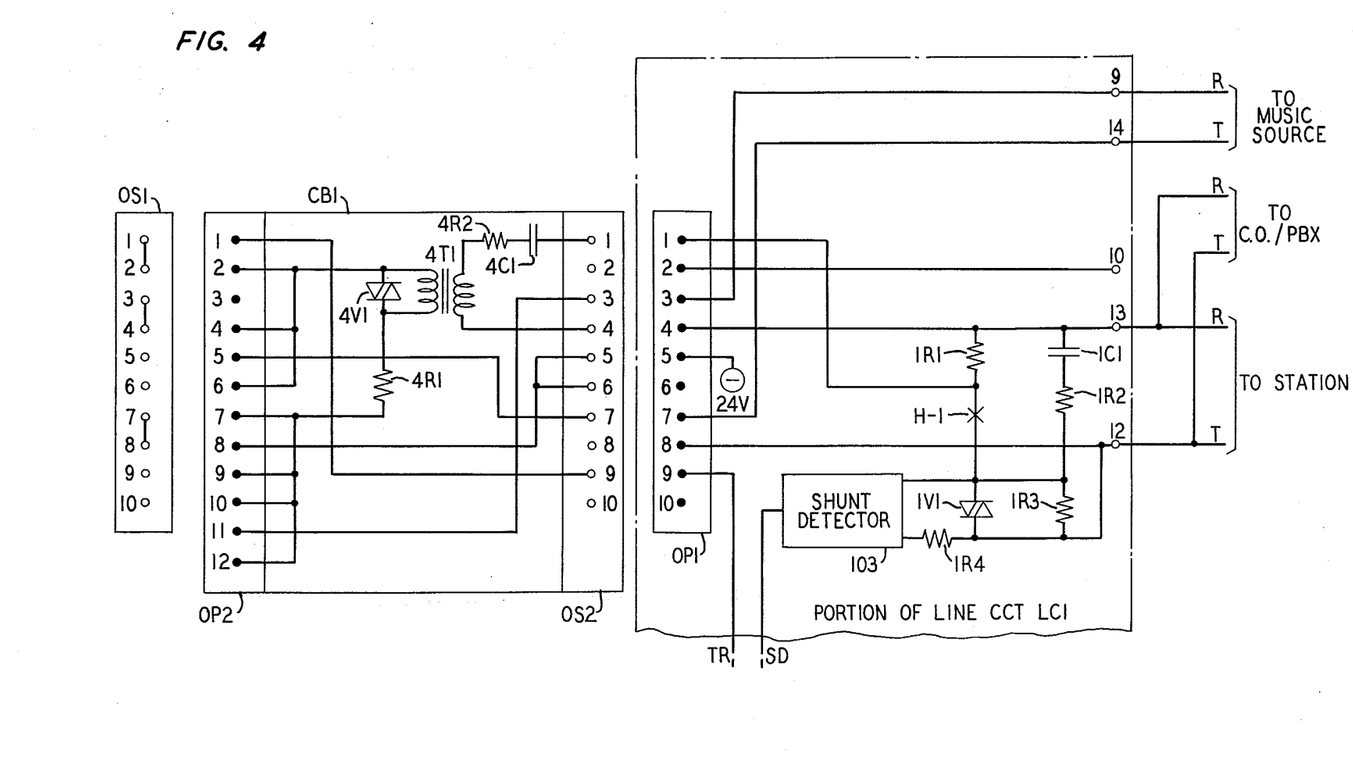

In FIG. 4 there is shown an embodiment of our invention where internally generated audio signals are provided to the station on hold. In this arrangement a coupler external to the line circuit is necessary to couple the audio signals to the CO/PBX line. For this purpose coupler CB1 is used and is adapted to plug into option plug OP1. Coupler CB1 includes socket OS2 which mates with option plug OP1 in the manner shown where pin 1 of the plug mates with pin 1 of the socket. Mounted on coupler CB1 is a second option plug OP2 having twelve pins. Option socket OS1, which is the same socket used in FIGS. 2 and 3, mates with option plug OP2 in the manner shown where the respective pin 1's are in contact with one another. When connected as shown in FIG. 4 tone signals on lead TR, which tone signals are generated in the manner previously described, are extended via pin 9 of the option plug and socket to pin 1 of option plug OP2 and via option socket OS1 to pin 2 and to one winding of transformer 4T1. The other side of the same winding of transformer 4T1 is connected through resistor 4R1 and pins 7 and 8 of option plug OP2 to a source of negative potential via pin 5 of option plug OP1.

The second winding of transformer 4T1 is connected via resistor 4R2 and capacitor 4C1 to pins 1 and 4 of option plug OP1 thereby extending the tone signals to terminal 13 of line circuit LC1 and to one side of resistor 1R1. As before because of the isolation of resistor 1R1, the tone signals are not extended over the CO/PBX line. When the H relay operates the tone signal is extended via enabled make contact H-1, and varistor 1V1 to lead T and to the PBX or CO connected station. Thus by using daughter board CB1 containing an external audio coupler and connecting the daughter board to line circuit LC1 via the same option plug as used for selected control of the audio signals, rewiring of either the line circuit or the option plug is eliminated.

Externally Provided Audio Signals

Figure 5:
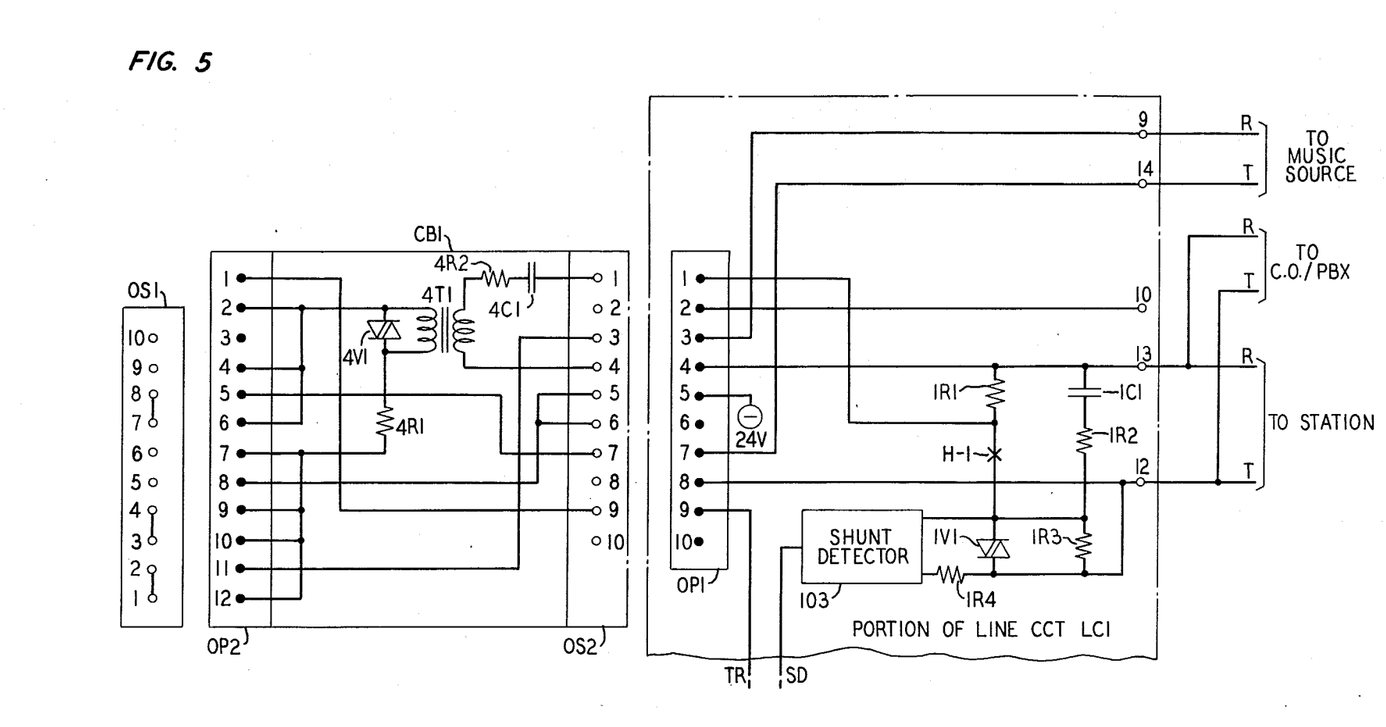

In FIG. 5 there is shown an embodiment of our invention where externally provided audio signals are extended to the station on hold. It should be noted that the circuit arrangement of FIG. 5 is the same as that of FIG. 4 except that option socket OS1 has been reversed and shifted with respect to option plug OP2 such that contact 1 of option socket OS1 now mates with pin 12 of option plug OP2 while contact 10 of option socket OS1 mates with pin 3 of option plug OP2. Externally provided music signals are extended to line circuit LC1 via terminals 9 and 14 and through pins 3 and 7 respectively of option plug OP1. These music signals are extended over daughter board CB1 from contact 7 of option socket OS2 via cross-connected pins 5 and 6 of option plug OP2 to one side of the winding of transformer 4T1. Music signals are also extended from contact 3 of option socket OS2 via cross-connected pins 11 and 12 of option plug OP2 via resistor 4R1 to the other side of the winding of transformer 4T1. The music signals which appear on the second winding of transformer 4T1 are provided to pins 1 and 4 of option plug OP1 in the same manner as is the internally provided tone signals and from this point the music signals are provided to the CO/PBX line in the exact manner as are the tone signals which were internally generated. Again, it should be noted that no external wiring changes are necessary to switch from internally provided tone to externally provided music provided that the CO/PBX line is already connected to pins 12 and 13 of the KTU, as this is accomplished by the simple reversal of option socket OS1. When internal signals are not used, the clock pulses are not needed and the line control functions can be provided with any number of known line circuits, such as, for example, the line circuit shown in U.S. Pat. No. 3,925,625.

What is claimed is:

1. A line circuit for use in controlling communication services between a telephone switching machine and a telephone station, said line circuit adapted for connection in parallel across the communication conduction pair between said switching machine and said telephone station and adapted for A-lead control from said station, said line circuit including
   hold and ringing control means,
   a source of clock signals,
   means controlled by said clock signals for detecting both A-lead signal changes, and communication lead signal changes and
   for comparing detected A-lead signals with detected communication lead signals, and
   for enabling selected ones of said hold or ringing control means,
   audio coupler means,
   means for generating from said clock signals a signal having a duty cycle, such that when said generated signal is applied to said audio coupler means a distinctive audio tone results, and
   means for optionally coupling said generated audio signal to said communication leads through said audio coupler when said hold means is enabled.

2. The invention set forth in claim 1 wherein said optionally coupling means includes
   a first connector having contacts permanently connected to said communication conducting pair, and
   a second connector adapted to mate with said first connector in a first positional relationship when said generated signal is not to be provided to said communication pair when said hold means is enabled.

3. The invention set forth in claim 2 wherein said optionally coupling means further includes a daughter board having mounted thereon a third connector adapted to mate with said first connector when said generated signal is to be provided to said communication pair when said hold means is enabled and wherein said audio coupler is permanently connected to said daughter board.

4. The invention set forth in claim 3 further comprising
   a source of distinctive audio signals other than said generated audio signals,
   means, including a fourth connector having contacts permanently connected to said daughter board for providing either said generated audio signals or said other distinctive audio signals to said communication pair when said hold means is enabled, said contacts of said fourth connector adapted for a mating relationship with said second connector, and
   means, including the positional relationship between said second and said fourth connectors for selectively controlling the provision of either said generated audio signals or said other distinctive audio signals.

5. The invention set forth in claim 2 further comprising a source of distinctive signals other than said generated signals,
   means for coupling said other distinctive signals to said communication pair when said hold means is enabled, said coupling means including the mating of said first and said second connectors in a second positional relationship, said first and said second positional relationships being the exact reverse of each other.

6. A line circuit for use in controlling communication services between a telephone switching machine and a telephone station, said line circuit adapted for A-lead control from said station, said line circuit means including hold and ringing control means, means for detecting A-lead signal changes, and communication lead signal changes, and operative for enabling a selected one of said hold or ringing means, means for receiving audio signals, means for optionally coupling said received audio signals to said communication leads when said hold means is enabled, said optionally coupling means including a first connector having contacts permanently connected to said communication conducting pair, and a second connector adapted to mate with said first connector in a first positional relationship when said received signal is to be provided to said communication pair when said hold means is enabled and to mate with said first connector in a second positional relationship when said received signal is not to be provided to said communication pair when said hold means is enabled.

7. The invention set forth in claim 6 wherein said optionally coupling means further includes a daughter board having mounted thereon a third connector adapted to mate with said first connector when said received signal is to be provided to said communication pair when said hold means is enabled and wherein said audio coupler is premanently connected to said daughter board.

8. The invention set forth in claim 7 further comprising means for generating within said line circuit distinctive audio signals other than said received audio signals, means, including a fourth connector having contacts permanently connected to said daughter board for providing either said received audio signals or said other distinctive audio signals to said communication pair when said hold means is enabled, said contacts of said fourth connector adapted for a mating relationship with said second connector, and means, including the positional relationship between said second and said fourth connectors for selectively controlling the provision of either said received audio signals or said other distinctive audio signals.

9. An option board for use in conjunction with a key telephone line circuit board, said line circuit board having a set of terminals which serve to control the provision of first and second audio signals to a Central Office or PBX line connected thereto when the connected line has been placed in the hold mode, said option board comprising a first connector for mating with said set of terminals, circuitry for receiving said first and said second audio signals via said first connector and for extending said signals to said line circuit board via said first connector, a set of terminals connected electrically with said circuitry and said first connector, said terminals being connected in a manner such that when said terminals are cross-connected in a first manner said first audio signals are provided to said line circuit and when said terminals are cross-connected in a second manner said second audio signals are provided to said line circuit.

10. The invention set forth in claim 9 wherein said first signals are supplied to said option board via said first connector from a source external to said line circuit board, and wherein said second signals are supplied to said option board via said first connector from a source internal to said line circuit.

11. The invention set forth in claim 10 wherein said option board set of terminals are adapted to receive in mating relationship therewith a second connector, the terminals of which said second connector are cross-connected to provide said first audio signals when positioned in a first relative position with respect to said option board set of terminals and to provide said second audio signals when positioned in a second relative position with respect to said option board set of terminals.

* * * * *